United States Patent [19]
Bunting

[11] 3,990,180
[45] Nov. 9, 1976

[54] PEAT CONTAINERS FOR THE PLANTING OF CONTAINERIZED SEEDLINGS

[76] Inventor: William M. Bunting, 1311 N. Foster Drive, Baton Rouge, La. 70806

[22] Filed: Sept. 13, 1974

[21] Appl. No.: 505,628

[52] U.S. Cl. .................................... 47/37; 44/32; 44/33; 47/58; 71/24; 260/17.3
[51] Int. Cl.² ......................................... A01G 9/10
[58] Field of Search .................. 47/37, 37.5, 56, 1, 47/57.6; 44/27, 32, 33, 21; 71/24, 64 A; 260/17.3

[56] References Cited
UNITED STATES PATENTS

| | | | |
|---|---|---|---|
| 390,546 | 10/1888 | Alkman | 44/32 |
| 624,629 | 5/1899 | Dickson | 44/32 |
| 700,421 | 5/1902 | Helbing | 44/32 |
| 806,868 | 12/1905 | Bunker | 44/32 |
| 1,000,479 | 8/1911 | Zindler | 44/32 X |
| 1,277,155 | 8/1918 | Testrup et al. | 71/24 |
| 1,446,113 | 2/1923 | Blackwell | 47/37 X |
| 1,501,101 | 7/1924 | Dow | 44/27 |
| 1,674,179 | 6/1928 | Rudeman | 44/27 |
| 1,691,734 | 11/1928 | Ober | 44/32 X |
| 1,775,837 | 9/1930 | Wedge | 47/37 |
| 2,019,824 | 11/1935 | Liehr et al. | 71/24 |
| 2,094,513 | 9/1937 | Wilson et al. | 47/37 X |
| 2,381,205 | 8/1945 | Caughey | 260/17.3 |
| 2,594,280 | 4/1952 | Beaudet | 260/17.3 X |
| 2,668,099 | 2/1954 | Cederquist | 44/33 |
| 2,695,838 | 11/1954 | Schabelitz | 44/32 |
| 2,785,969 | 3/1957 | Clawson | 47/47 UX |
| 2,822,321 | 2/1958 | Pickard | 44/33 X |
| 3,009,289 | 11/1961 | Tokacs | 47/37 X |
| 3,174,940 | 3/1965 | La Coste | 260/17.3 X |
| 3,375,607 | 4/1968 | Melvold | 47/34.13 X |
| 3,467,609 | 9/1969 | Adams et al. | 47/37 X |
| 3,493,417 | 2/1970 | Moren et al. | 260/17.3 X |
| 3,656,930 | 4/1972 | Martin | 47/37 UX |
| 3,728,216 | 4/1973 | Bankert | 260/17.3 X |
| 3,852,913 | 12/1974 | Clendinning et al. | 47/37 |

FOREIGN PATENTS OR APPLICATIONS

| | | | |
|---|---|---|---|
| 552,460 | 1/1958 | Canada | 44/32 |
| 541,050 | 5/1957 | Canada | 44/32 |
| 518,597 | 11/1955 | Canada | 44/33 |
| 1,070,592 | 12/1959 | Germany | 44/32 |
| 1,146,302 | 3/1963 | Germany | 47/37 |
| 665,164 | 1/1952 | United Kingdom | 44/27 |
| 228,993 | 2/1925 | United Kingdom | 44/27 |
| 762,483 | 11/1956 | United Kingdom | 44/27 |
| 747,869 | 4/1956 | United Kingdom | 44/27 |
| 1,259,344 | 1/1972 | United Kingdom | 47/57.6 |
| 21,549 | 12/1895 | United Kingdom | 44/32 |

*Primary Examiner*—Robert E. Bagwill
*Assistant Examiner*—Steven A. Bratlie

[57] ABSTRACT

As an article of manufacture, a plug shaped receptacle or hollow container made of peat, pre-shaped and re-acted at conditions of temperature and pressure sufficient to cause reaction and polymerization of the naturally occuring functional groups of the peat. In preferred embodiments one or more chemical reagents are also added to react and polymerize with the natural functional groups of the peat and enhance the properties of the so formed peat container.

16 Claims, 1 Drawing Figure

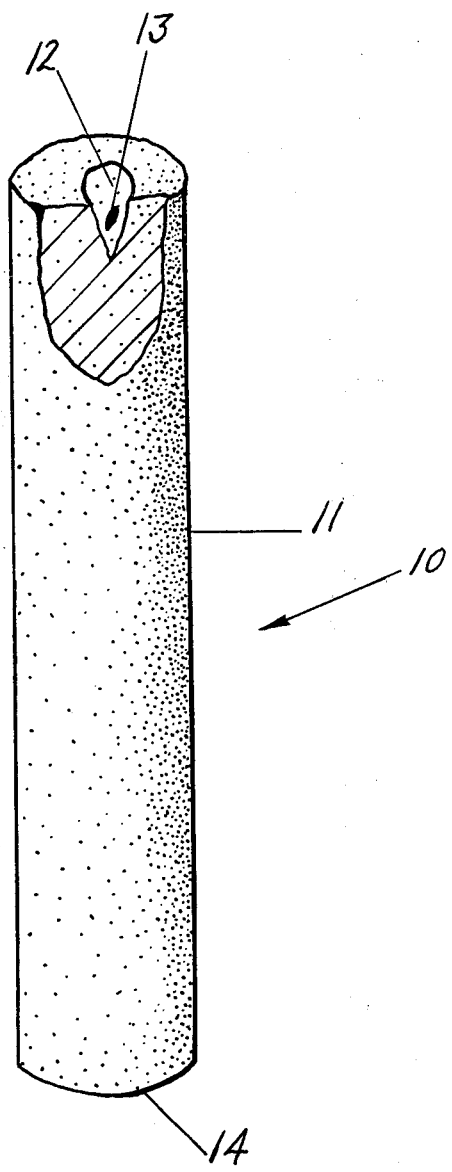

PEAT CONTAINERS FOR THE PLANTING OF CONTAINERIZED SEEDLINGS

FIELD OF THE INVENTION

This invention relates to novel peat, plug shaped receptacles, or containers, for use in the production of containerized seedlings.

In container planting, as now practiced throughout most of the world, seeds or seedlings, hereinafter referred to as seedlings, of young plants or trees are placed within containers in nursery soil and/or peat, with or without added plant nutrients, and subsequently planted in a desired location along with the container. The current operational and research-development programs now being conducted throughout the world provide eloquent testimony of the need for improved methods and techniques of container planting, and nowwhere is the need more apparent than that of providing new types of containers for seedlings. Various operational and research programs, and the various problems associated with container planting, are discussed in *Proceedings of a Workshop on Container Planting in Canada*, edited by R. M. Waldron, Directorate of Program Coordination, Ottawa, Ontario, Information Report DPC-X-2; Department of the Environment, Canadian Forestry Service, January, 1972.

An essential feature of such containers is that once the containerized seedling is planted, the seedling roots must have ready egress to the surrounding soil. Consequently the container must be made of a material penetrable by the seedling roots or it must be decomposable, or capable of disintegrating within the soil within which it is planted. Otherwise, the seedling must be separated from the container before the seedling is planted so that the plant can grow without undue suppression of root growth. Hence, some prior art containers are formed from peat, paper or cardboard impregnated with various materials to suppress biodegradation, seedlings are placed therein and the containerized seedlings are planted within the soil. Such containerized seedlings must be of sufficient mechanical strength to be handled without disintegration while in the nursery and while eventually materials of the required mechanical strength do disintegrate within the soil, more often than not the time required for such disintegration is sufficiently prolonged to suppress normal and healthy root growth, thus leading to dwarfing or even death of the plant. If lacking mechanical strength, the containers cannot be handled normally nor planted mechanically, and generally they deteriorate prematurely and hence are not suitable for containerized plantings.

Other containers are constructed of, e.g. thin wall plastic tubes which are adequate for nursery handling and mechanical planting. The thin walls of the tubes are split prior to the time that the containerized seedlings are planted so that the roots of the plant can escape the confines of the planted container. Root growth nonetheless is all too often seriously restricted and even the stems of the plants are damaged.

As a result of these difficulties, the container planting of seedlings is often abandoned in favor of "plug plantings." In plug planting the seedling is completely removed from a mold, or container, just prior to the planting of the plug, Illustrative of containers of this type now in commercial use are the BC/CFS Styroblock, Spencer-Lemaire fold-up plug tray, and RCA "peat sausage." Paperpots, e.g. Japanese paperpots, also classifiable as degradable containers, are also often used as molds for plugs because of the lack of control over the time that it takes the container to decompose.

It is accordingly a primary object of the present invention to obviate these and other prior art deficiencies by providing, as new and novel articles of manufacture, peat containers for use in the production of containerized seedlings.

A particular object is to provide containers of the character described which are readily disintegrated within the soil, and yet possess adequate mechanical strength for normal nursery handling and for machine planting.

A further object is to provide articles of manufacture, as characterized, which are highly economical, requiring relatively low cost materials and moderately priced capital investment items such as pilling and extrusion apparatus which are used for forming the containers.

These objects and others are achieved in accordance with the present invention which contemplates, as an article of manufacture, a plug shaped receptacle, or a substantially hollow container made of peat, pre-shaped and reacted at conditions of temperature and pressure sufficient to cause the naturally occurring chemically reactive functional groups of the peat to polymerize. In preferred embodiments, peat plug receptacles or containers are formed by the addition to the natural peat of a chemical reagent (i.e. a compound, e.g. a hydrocarbon compound), or chemical reagents, a molecule of which supplies two or more of the same functional groups which occurs naturally in the peat, or a chemical reagent, or chemical reagents, a molecule of which supplies two or more functional groups capable of polymerizing with those which occur within the natural peat, in suitable concentration such that the peat can be pre-shaped and then reacted at suitable conditions of temperature and pressure, of sufficient duration, to effect polymerization.

In its most basic form the peat plug receptacle, or container of this invention is a reaction product of a pre-shaped mass of peat which is heated at sufficient temperature and pressure, to produce chemical reaction between naturally occurring reactive functional groups such as hydroxy, carboxyl and phenolic groups, such that the pre-shaped mass of peat is set to provide the desirable properties of a receptacle, or container, for use in the production of containerized seedlings suitable for planting. Suitably such properties are provided by pressing a pre-shaped mass of natural peat at pressures ranging from about 5 pounds per square inch (psig) to about 4000 psig and preferably at pressures ranging from about 50 psig to about 500 psig at temperatures ranging from about 100° to about 500° F, and preferably at temperatures ranging from about 175° to about 350° F.

It is understood, of course, that the degree of heat and the amount of pressure required to polymerize the functional groups of the peat will vary, depending to some extent on the nature of the functional groups naturally present in the peat, and on the nature of the chemical reagent which is added, if any. The temperature and pressure will also vary in relation to the duration, or time of the treatment. The time required for the treatment bears an almost direct inverse relationship to the applied temperature; i.e. the greater the temperature the less time is required for effecting polymerization and, conversely, the lower the temperature the greater the time required for effecting polymerization. The same relationship holds between pressure and the time of treatment, but pressure per se is less sensitive for effectively polymerizing the peat than temperature. With sufficiently higher temperature and pressure a time duration of from about 3 to 5 minutes appears adequate in some instances to effect the polymerization, though in most commercial operations the time of treatment will vary from about 0.1 to about 6 hours, and preferably from about 0.25 to about 2 hours.

In some instances the plug shaped receptacle, or container, can be shaped in a short period such as 2 seconds, removed from the die or mold and heated to fix the shape. Chemical reagents can be added prior to, during or following shaping, but prior to heating at the desired temperature to effect polymerization.

Whereas the amount of water contained in the pre-shaped mass of peat is not critical, excess water is not desirable, and normally the peat is one containing water in concentration such as occurs on normal exposure of the peat to air. Natural peat, which varies from a light, spongy material mainly composed of sphagnum moss in the upper layers to a dense, brown, more humidified substance at the bottom of thick bogs, thus contains from about 90 to 95 weight percent of water which by draining approaches 88 to 91 percent water. In commercial operations, air drying is normally used to reduce the water content; but even after air-drying peat naturally takes up to about 16 percent water, and therefore the water is seldom dried below this water content. Hence, it is generally preferred that the water content of the peat not exceed about 16 weight percent since it is found that water slows the rate of reaction.

Peat containers of preferred type can also be formed from a pre-shaped mass of peat to which a chemical reagent, or chemical reagents, a molecule of which contains two or more of the same functional groups which naturally occur within the past have been added. Such chemical reagent, or reagents is preferably an organo or hydrocarbon compound which contains multiple hydroxy, carboxyl and/or phenolic groups or a chemical reagent which will generate compounds in situ which contain such functional groups. Suitable reactants of this type include up to about 60, or more, carbon atoms, preferably from 2 to about 36 carbon atoms, e.g., aliphatic dicarboxylic acids such as oxalic acid, succinic acid, glutaric acid, adipic acid, suberic acid, thapsic acid, maleic acid fumaric acid, glutaconic acid and the like; aliphatic polycarboxylic acids such as 1,1,5-pentanetricarboxylic acid, tricarballylic acid and the like; aromatic dicarboxylic acids such as phthalic acid, isophthalic acid, terephthalic acid and the like; and aromatic polycarboxylic acids such as trimesic acid mellophanic acid, prehnitic acid and the like; aliphatic polyols, phenols and and alcohols, such as 1,2,3-propanetriol and the like; and aromatic polyols such as 1-phenyl-1,2,3-propanetriol, 1,5-naphthalenedimethanol, 2-methyl-1,3-naphthalenediol, 1,4,5,8-naphthalenetetrol and the like. Suitably, such hydrocarbons are added to the mass of peat in minimum concentrations consistent with the objective of forming at reaction conditions, a reaction product suitable for use in the production of containerized seedlings fit for planting. Such reactants are generally added to the peat mass in less than or stoichiometric quantities sufficient to react with the natural reactive groups found in the peat. In general, the reactants are added to the peat in concentration ranging from about 0.1 to about 25 percent, and preferably from about 1 to about 10 percent, based on the weight of the total peat mass, shaped and used in the reaction.

Amines and aldehydes which contain two or more primary amino groups, or two or more aldehyde groups, respectively, per molecule, or compounds which can generate such types of polyfunctional primary amines and aldehydes in situ, though they do not contain groups similar to those naturally occurring in peat, have also been found particularly suitable for addition to a mass of peat. Exemplary of such amines are those containing up to about 60, preferably from 2 to about 36 carbon atoms, include aliphatic polyamines such as ethylenediamine, diethylenetriamine, putrescine, 1,2-propanediamine, 1,6-hexanediamine, cadaverine and the like; and aromatic polyamines such as o-phenylenediamine, 1,4-naphthalenediamine, 3,3'-biphenylenediamine, 1,2,3-benzenetriamine and the like. Exemplary of such aldehydes are those containing up to about 60, preferably 2 to about 36 carbon atoms, such as aliphatic polyfunctional aldehydes, e.g., gluteraldehyde, 3-octen-5-ynedial, glutaconaldehyde, 1,1,5-pentanetricarboxaldehyde and the like; aromatic polyfunctional aldehydes such as phthalaldehyde, 2,7-naphthalenedicarboxaldehyde and the like. These amines and aldehydes, termed herein polyfunctional amines and aldehydes, like the hydrocarbon compounds which contain multiple hydroxy, carboxyl and phenolic functional groups are also added to the peat mass in minimum concentration consistent with the objective of forming, at reaction conditions, a shaped product suitable as a seedling receptacle for planting. Likewise, these compounds are generally added in less than or stoichiometric quantities determined by the naturally occurring reactive hydroxyl, carboxyl, and phenolic groups present in the peat. Generally no more reactant is added than will react under the reaction conditions. Too much reactant can have a deleterious effect. The addition of an excess of an amine can thus produce a basic pH, and generally a neutral or acid pH is preferred for growing plants. In general, the amines and aldehydes are added in quantities ranging from about 0.1 to about 25 percent, preferably from about 1 to about 10 percent, based on the weight of the total peat mass, shaped and used in the reaction. Most often, a considerably lesser concentration of the amine is required than is required when aldehydes are used.

In general, it is desirable to dissolve the hydrocarbon reactant in a solvent to more effectively disperse the reactant within the peat and hence water solubility of the reactant is desirable since water is the preferred solvent; largely because of its ready availability and low cost. However, organic solvents can also be used for such purpose, e.g. alcohols, petroleum ether, ethers, low molecular weight esters and the like, although addition of monofunctional molecules capable of reacting with the peat or reagent can block polymerizing sites.

While Applicant does not desire to be bound by a specific theory on mechanism, it is believed that the heating of the peat under pressure causes reaction between carboxyl groups and hydroxyl groups to bind the particles of peat together by forming esters, to wit:

Increased pressure pushes the peat particles, of varying sizes, together such that increased numbers of the functional groups are brought into reaction proximity. Unlike peat pressed together at ambient temperature, the particles of peat in a finished plug shaped receptacle, or container, thus no longer merely crumbles, or falls apart, as by application of slight forces, or crumbles and falls apart on mere wetting. Instead, the so formed container can be wetted to provide moisture for plant growth, plant nutrients can be added in various solution forms. Moreover, the finished container is strong during seedling growth prior to planting, and is capable of being mechanically planted in the ground along with the growing seedling. After planting, the seedling roots can readily penetrate the container walls without injury to the growing plant.

The various reactants added to the peat, aside from aiding in the formation of the container, provide various other properties. The addition of amines, e.g., increases the ease of wetting of the polymerized peat. The peat more rapidly picks up water when sprayed or wetted. The ability of peat to pick up water for nourishment of the growing plant is of profound importance Hydroxyethylcellulose, beside taking part in the polymerization reaction, acts as a lubricant and hence the pressure required for extrusion of peat, a preferred technique for forming the peat plug receptacle, or container, is lower than when hydroxyethylcellulose is not added.

Referring to the attached FIGURE there is shown a peat plug receptacle, or container 10, formed from a substantially cylindrical shaped enclosing side wall 11. The plug shaped, or generally cylindrical shaped container 10, of type formed by extrusion is provided with an open top or hole 12 into which the seed or seedling 13 can be placed. In some instances the hole or opening can be formed by the physical pressure of pressing a seed into the peat plug, the opening being formed without damage to the seed or plug. The bottom 14 of the receptacle is closed at least sufficient to retain the seedling within the container 10 for planting of both seedling and container. Alternatively, a hole can be placed in both ends so that in planting seeds on a large scale it does not matter which end of the plug is up. After placement in the opening, or hole, 12, the seed or seedling can be covered with soil if desired.

The following examples and comparative data are illustrative, and bring out the more salient features of the invention. All parts and percentages are given in terms of weight, temperatures in degrees Fahrenheit, and pressure in pounds per square inch gauge (psig). Actual weight units are expressed in grams (g). Volumetric units are expressed in cubic centimeters (cc) and linear units are given in terms of millimeters (mm).

In Examples 1 through 7 which immediately follow, and in Examples 10 and 11, sphagnum peat moss was formed into polymerized peat plugs which when hollowed out, provided admirably suitable containers for seedlings. The same is true of the plugs described by reference to Examples 8 and 9, the plugs in this instance having been formed from cane peat.

EXAMPLE 1

A 10 g portion of sphagnum peat moss was forced into a die and held under an initial pressure of 40 psig while heated at 250° F for a period of 1 hour. The peat plug proved of quality adequate for use as a container for seedlings. It proved capable of ordinary nursery handling, and suitable as a container for a seedling.

EXAMPLE 2

To a 10 g portion of sphagnum peat moss was added a solution of one gram of diethylenetriamine in 65 g of water. The mixture was then treated generally as in the preceding example, to wit: A portion of the mixture was forced into a die and held under an initial pressure of 15 psig while heated at 250° F for 1 hour. The plug was of quality which proved capable of nursery handling, admirably suitable as a container for a seedling, capable of machine handling and suitable for planting along with the seedling.

In forming a plug in similar manner, except that pressure was not applied the plug was lacking in strength. In forming a plug in similar manner, except that heat was not applied, the rate of polymerization was extremely slow.

EXAMPLE 3

To 10 g of peat was added one gram of ethylenediamine in 65 g of water. After thorough stirring, a portion of the peat mixture was charged to a die having a cylindrical hole nominally one inch in diameter and five inches long. After gentle compression sufficient to form an approximately two inch long plug, the plug was heated to 250° F in the die and held at that temperature for one hour. The plug was removed from the die and again heated at 250° F for an additional hour. The finished plug weighed 3.5 g, had a volume of 16.9 cc, was 24.8 mm in diameter and 35 mm long. The plug held together when wetted.

The quality of the plug in this instance was highly suited for nursery handling, and a containerized seedling formed from such a plug was admirably suitable for mechanized handling. After planting, the containerized seedling proved of quality suitable for producing a young, healthy tree.

EXAMPLES 4 and 5

The procedures of Example 3 were again repeated using, with 10 g portions of sphagnum peat moss, (a) 2.5 g of propylene glycol in 50 g of water and (b) 3 g of triethanol amine in 50 g of water, respectively, to form plugs.

As was the case in Example 3, each of the plugs proved of quality highly suitable for nursery handling, formation of containerized seedlings, mechanical handling and planting.

EXAMPLE 6

To 16 g of peat was added 0.8 g of diethylene triamine in 20 g of water. After thorough mixing, a portion of the mixture was charged to a one inch die. The die was placed in a press and a constant load of 440 psig applied upon the peat. The die was then heated to 250° F and held at that temperature for about two hours. During the reaction period it was observed that the peat plug gradually compressed. At the end of the 2 hours, the die was cooled and the plug removed. The plug was strong and wetted readily without loss of shape.

The plug proved admirably suitable for nursery handling, use as a container for seedlings, suitable for mechanical planting, and for the production of a young healthy plant.

EXAMPLE 7

Six additional plugs were formed by combining 10 g portions of sphagnum peat moss with each of the five reagents described in the table below, and in one instance, as also identified in the table below, no reagent was added. The peat, with the reagent, if any, was in each instance mixed in 10 g of water. After thorough mixing, a portion of each of the mixtures was separately charged to a die with a hole one inch in diameter which had been preheated to 266° F. The peat mixture was put under a constant 70 psig pressure and heated for 10 minutes. During the reaction period, it was observed that all of the plugs gradually compressed. The plugs, after this period of treatment, were each then placed in water, heated with a bunsen burner until the water boiled and held in boiling water until disintegration or for fifteen minutes, whichever occurred sooner. The results are recorded in the following table.

Table

| Reagent | Time in Boiling Water |
| --- | --- |
| 0.5 g Succinic Acid | 3–5 minutes |
| 0.5 g Succinic Anhydride | 3–5 minutes |
| 0.5 g Diethylenetriamine | Greater than 15 minutes |
| 0.5 g Propylene Glycol | 3–5 minutes |
| 0.5 g Gluteraldehyde | Greater than 15 minutes |
| None | 3–5 minutes |

These demonstrations thus clearly illustrate the increased wet strength which results upon the use of an added polymerizing reagent when it is a polyaldehyde or a polyamine.

It is interesting to observe that a gradual and continuing compression of the peat takes place during the treatment of the peat under conditions of heat and pressure, even where no chemical reagent is applied. Such gradual compression however does not occur if no heat is applied, even though pressure is applied. A plug formed in such manner if heated in water, unlike the plugs demonstrated and tabulated in the above table, will decompose long prior to the time that the water reaches the boiling point.

EXAMPLE 8

A 10 g portion of cane peat, without use of a reagent, was admixed with 65 g of water. The admixture was forced into a die under pressure, and heated at 225° F for 2 hours. The plug, on removal from the die proved of quality suitable for nursery handling, machine handling and planting of a seedling contained therein.

EXAMPLE 9

The procedure of Example 8 was repeated, and with similar results, by forming a plug from cane peat mixed with diethylene triamine (5%) in water (50%) and heated for one hour in a die at 250° F.

The following examples describe the production of peat plugs of quality suitable as containers by extrusion techniques.

EXAMPLE 10

To 600 g of sphagnum peat moss was added 18 g of ethylene diamine in small droplets. After mixing, the mixture was extruded through an extruder having a 1 inch diameter broached barrel and a 1 inch diameter die, at a temperature of 302° F, to give a peat extrudate chemically held together.

The resultant polymerized peat was of quality suitable for nursery handling and machinery planting as a containerized seedling. The plug itself was found of quality which could be planted, and subsequently fractured by the roots of a growing plant without injury in the plant.

EXAMPLE 11

To 600 g of sphagnum peat was added 18 g of ethylene diamine in 200 g of water. After mixing, 18 g of gluteraldehyde in 118 g of water was added. The mixture was extruded at 248° F through an extruder having a one inch diameter broached barrel and a die with a hole one inch in diameter. The resultant polymerized peat extrudate had a density of about 6 g per inch after drying at 250° F for two hours.

The quality of the plug was quite similar to that described by reference to Example 10.

It is apparent that various modifications and changes can be made, e.g. as in the dimensions, size and shape of the peat receptacles or containers, or in the time-temperature-pressure relationships used to effect the polymerization of the peat, in forming the containers, without departing the spirit and scope of the invention.

The precise dimensions, size and shape of the peat receptacle, or container, is thus not material except that there must be a space within which the seed or seedling is at least partially enclosed, i.e. as provided by a receptacle or container having an enclosing side wall, or walls, and a bottom sufficiently closed such that a seed or seedling can be inserted within the confines of the wall and contained. The side wall, or walls, are generally relatively thin so that the roots of the seedling can penetrate them without significant damage after planting. The bottom wall need not be closed completely, but must be sufficiently restricted that the seed or seedling can be retained after insertion. This might be accomplished by the type of enclosure provided by a hollow or tubular shaped receptacle, if desired. A plug shape hollowed out from the top sufficiently to provide an enclosed area for the seed or seedling is found quite advantageous.

Time and temperature, and time and pressure are interrelated, as is common in reactions of this type. Sufficient pressure is required to bring the functional groups into reaction proximity. Polymerizations can be effected normally at lower temperatures by increasing the intensity of the pressure. The time required for polymerizations can be shortened at higher temperatures.

The peat mass used to form the receptacle can be essentially all peat, but peat can be admixed with other matter such as paper pulp and the like. The presence of other substances will obviously alter time-temperature and time-pressure relationships. Preferably, the peat used in the formation of such receptacles is essentially peat undiluted with other materials, other than added chemical reagents. After formation of the receptacle, or container, other materials can be added for nurture of the seedling, e.g. fertilizer, soil, unreacted peat, various plant nutrients and the like.

Having described the invention what is claimed is:

1. As an article of manufacture, a plug-shaped concontainer made of peat for containing a seed or seedling, formed from a mass of chemically untreated natural peat to which has been added, in concentration ranging between about 0.1 and about 25%, based on the weight of the peat, an amine which contains two or more primary amino functional groups per molecule, said container having been preshaped and reacted at temperature ranging from about 100° to about 500° F and pressure ranging from about 50 psig to about 500 psig sufficient to cause reaction and polymerization between functional groups of said amine and the naturally occurring functional groups of the peat, whereby when planted the roots of the seed or seedling can penetrate through the container.

2. The article of manufacture of claim 1 wherein the amine contains up to about 60 carbon atoms in the molecule.

3. The article of manufacture of claim 1 wherein the amine contains from 2 to about 36 carbon atoms in the molecule.

4. The article of manufacture of claim 1 wherein the amine is added in concentration ranging between about 1 and about 10 percent, based on the weight of the unreacted peat.

5. The article of manufacture of claim 1 wherein the amine which is added to the mass of peat is dissolved in a solvent prior to its addition to the mass of peat.

6. The article of manufacture of claim 1 wherein the temperature ranges from about 175° to about 350° F.

7. The article of manufacture of claim 1 wherein the time of reaction ranges from about 0.1 to about 6 hours.

8. The article of manufacture of claim 1 wherein the time of reaction ranges from about 0.25 to about 2 hours.

9. As an article of manufacture, a plug-shaped container made of peat for containing a seed or seedling, formed from a mass of chemically untreated natural peat to which has been added, in concentration ranging between about 0.1 and about 25%, based on the weight of the peat, an aldehyde which contains two or more aldehyde functional groups per molecule, said container having been preshaped and reacted at temperature ranging from about 100° to about 500° F and pressure ranging from about 50 psig to about 500 psig sufficient to cause reaction and polymerization between functional groups of said aldehyde and the naturally occurring functional groups of the peat, whereby when planted the roots of the seed or seedling can penetrate through the container.

10. The article of manufacture of claim 9 wherein the aldehyde contains up to about 60 carbon atoms in the molecule.

11. The article of manufacture of claim 9 wherein the aldehyde contains 2 to about 36 carbon atoms in the molecule.

12. The article of manufacture of claim 9 wherein the aldehyde is added in concentration ranging between about 1 and about 10 percent, based on the weight of the unreacted peat.

13. The article of manufacture of claim 9 wherein the aldehyde which is added to the mass of peat is dissolved in a solvent prior to its addition to the mass of peat.

14. The article of manufacture of claim 9 wherein the temperature ranges from about 175° to about 350° F.

15. The article of manufacture of claim 9 wherein the time of reaction ranges from about 0.1 to about 6 hours.

16. The article of manufacture of claim 9 wherein the time of reaction ranges from about 0.25 to about 2 hours.

* * * * *